(12) United States Patent
Kolahi

(10) Patent No.: US 6,557,422 B1
(45) Date of Patent: May 6, 2003

(54) MASS FLOW RATE MEASURING DEVICE

(75) Inventor: Kourush Kolahi, Kiel (DE)

(73) Assignee: Krohne A.G. (CH)

( * ) Notice: Subject to any disclaimer, the term of this patent is extended or adjusted under 35 U.S.C. 154(b) by 0 days.

(21) Appl. No.: 09/937,117

(22) PCT Filed: Jan. 22, 2001

(86) PCT No.: PCT/EP01/00674

§ 371 (c)(1),
(2), (4) Date: Jan. 25, 2002

(87) PCT Pub. No.: WO01/75399

PCT Pub. Date: Oct. 11, 2001

(30) Foreign Application Priority Data

Jan. 21, 2000 (DE) .......................... 100 02 63

(51) Int. Cl.⁷ .................................................. G01F 1/84
(52) U.S. Cl. ........................... 73/861.357; 73/861.355
(58) Field of Search ...................... 73/861.357, 861.38, 73/861.37, 861.356, 861.355, 861.312; 702/45

(56) References Cited

U.S. PATENT DOCUMENTS

| 4,781,069 A | 11/1988 | Mitzner | |
|---|---|---|---|
| 4,823,614 A | 4/1989 | Dahlin | |
| 4,882,935 A * | 11/1989 | Lew | 73/861.357 |
| 5,115,683 A * | 5/1992 | Pratt | 73/861.355 |
| 5,827,979 A * | 10/1998 | Schott et al. | 73/861.356 |
| 6,332,366 B1 * | 12/2001 | Wray | 73/861.356 |
| 6,336,370 B1 * | 1/2002 | van der Pol | 73/864.357 |

FOREIGN PATENT DOCUMENTS

| EP | 0 905 488 A2 | 3/1999 |
|---|---|---|
| EP | 0 905 488 A3 | 4/1999 |
| EP | 0 926 473 A2 | 6/1999 |
| WO | WO 99/28708 | 6/1999 |
| WO | WO 99/44018 | 9/1999 |

* cited by examiner

*Primary Examiner*—Hezron Williams
*Assistant Examiner*—Takisha S Miller
(74) *Attorney, Agent, or Firm*—Cesari and McKenna, LLP (57) ABSTRACT

A method for online-determination of at least one characteristic value of a mass flowmeter operating by the Coriolis principal and incorporating a fluid-conducting Coriolis conduit. The method includes the following steps of exciting the Coriolis conduit in a first oscillation pattern, exciting the Coriolis conduit in a second oscillation pattern, the second oscillation pattern being different from the first oscillation pattern, capturing the response of the Coriolis conduit to the excitation in the first oscillation pattern and in the second oscillation pattern and determining at least one characteristic value of the mass flowmeter by evaluating the response of the Coriolis conduit with the aid of a model in real time during operation of the mass flowmeter.

8 Claims, 3 Drawing Sheets

MASS FLOW RATE MEASURING DEVICE

RELATED APPLICATION

Not Applicable

BACKGROUND OF THE INVENTION

1. Field of the Invention

This invention relates to a mass flowmeter operating by the Coriolis principle, incorporating a fluid-conducting Coriolis conduit, at least two oscillators associated with and exciting the Coriolis conduit, as well as at least two detectors associated with the Coriolis conduit for capturing Coriolis forces and/or Coriolis-force-derived Coriolis oscillations, said Coriolis conduit permitting excitation in a first oscillation pattern and in an oscillation pattern independent of the first oscillation pattern. The invention further relates to a method for determining the mass flow employing a mass flowmeter operating by the Coriolis principle and incorporating a fluid-conducting Coriolis conduit, at least two oscillators associated with and exciting the Coriolis conduit, as well as at least two detectors associated with the Coriolis conduit for capturing Coriolis forces and/or Coriolis-force-derived Coriolis oscillations, said Coriolis conduit permitting excitation in a first oscillation pattern and in an oscillation pattern independent of the first oscillation pattern.

The above states that the mass flowmeter here discussed incorporates, inter alia, at least two oscillators "associated with" the Coriolis conduit and at least two detectors "associated with" the Coriolis conduit. As a rule, however, the oscillators or at least part thereof and the detectors or at least part thereof are connected to the Coriolis conduit. But since this is not an absolute must, the term "associated with" is being used instead of "connected to".

There is a fundamental differentiation between Coriolis-type mass flowmeters whose Coriolis conduit is essentially straight and those whose Coriolis conduit is looped. As another differentiating feature in mass flowmeters of the type being discussed, one design concept provides for only one Coriolis conduit while other models come with two Coriolis conduits. In the design versions incorporating two Coriolis conduits, the latter may be laid out in an in-line or a parallel flow configuration.

In more recent times, flowmeters with only one essentially straight Coriolis conduit have gained predominance. In terms of their mechanical architecture, flowmeters with one straight Coriolis conduit are simpler and can be produced at a comparatively lower cost, the inner surfaces of their Coriolis conduit are easily accessible for finishing processes such as polishing, they are subject to only minor pressure drops, and they are self-purging.

Yet their many advantages notwithstanding, mass flowmeters with only one straight Coriolis conduit also pose problems in certain respects.

Mass flowmeters operating by the Coriolis principle produce direct mass-flow readings representing a true mean value across the flow profile of the fluid traveling through the Coriolis conduit. Under ideal conditions, Coriolis-type mass flowmeters, by virtue of their very operating principle, deliver readings which are not influenced by the physical characteristics of the fluid passing through the Coriolis conduit, such as thermal conductivity and thermal capacity, or process parameters such as pressure and temperature. Nevertheless, asymmetries in the mass flowmeter, attributable for instance to unavoidable production tolerances, or changes encountered over time in terms of the operating conditions such as temperature fluctuations or varying clamping parameters lead to a reduction of the measuring precision of the mass flowmeter which, due its design concept, would otherwise be very high. These problems are particularly pronounced in the case of mass flowmeters with only one straight Coriolis conduit.

2. Description of the Prior Art

Various attempts have been made to compensate for the effects of changing operating conditions such as temperature fluctuations or the clamping parameters of the Coriolis conduit when measuring the mass flow. For example, in the case of the above-mentioned mass flowmeter of this type (ref. DE 44 13 239 A1) the design includes provisions which, during operation, measure the intrinsic frequency of the Coriolis conduit in the Coriolis mode, by exciting the Coriolis conduit not only in its operating mode but in the Coriolis mode as well. That, however, does not completely compensate for the above-mentioned varying environmental operating parameters. Specifically, in the case of the mass flowmeter referred to only the effect of temperature changes on the density of the fluid traveling through the Coriolis conduit and the attendant change of the resonant frequency of the fluid-conducting Coriolis in the Coriolis mode are factored in. However, the parameters of the mass flowmeter such as its zero point and its sensitivity cannot be determined that way.

Other problems of mass flowmeters with only one straight Coriolis conduit derive from the fact that the oscillating components, which essentially means the Coriolis conduit proper, transfer oscillating forces or torque to the points at which the Coriolis conduit is clamped, forces which especially in the case of mass flowmeters with only one straight Coriolis conduit cannot be absorbed without a reactive effect. This can cause oscillatory energy to be asymmetrically drained from the Coriolis conduit into the environment and to be unevenly reflected back and coupled into the Coriolis conduit, or vibrations emanating from the surrounding area can be unevenly coupled into the input or output half of the Coriolis conduit, leading to correspondingly corrupted measuring results.

Attempts have been made in the prior art to solve this problem with the aid of counter-oscillations. These generally serve to compensate for housing vibrations. In this context, reference is made for instance to DE 198 40 782 A1, EP 0 598 287 A1, EP 0 759 542 A1, EP 0 831 306 and EP 0 849 568 A1. In spite of these mechanically complex counter-oscillators, the oscillatory separation of Coriolis-type mass flowmeters from the environment has so far remained unsatisfactory. There are also other problems such as the effects of pulsations, meaning continuum fluctuations of the fluid in the Coriolis conduit, on the measuring results, or irregular oscillations of the Coriolis conduit in the case of major inhomogeneities of the conducted fluid. For these reasons, parameters such as zero point and sensitivity change during operation.

SUMMARY OF THE INVENTION

It is therefore the objective of this invention to introduce both a mass flowmeter and a method for the determination of the mass flow by means of which greater accuracy and zero-point stability are attainable.

The mass flowmeter according to this invention which solves the above-described problem and meets the stated objective is typified in that characteristic values of the mass flowmeter can be determined on the basis of a model.

As stated further above, the Coriolis conduit can be excited in mutually independent oscillation patterns. Of course, this excitation in mutually independent oscillatory patterns applies not only to the Coriolis conduit alone but also to the Coriolis conduit as it conducts the fluid whose mass flow is to be measured.

It is fundamentally possible to perform the model-based determination of the characteristic values of the mass flowmeter prior to the start-up of the device or during operating stoppages. However, according to a preferred enhancement of the invention, provisions are made permitting the determination of the characteristic values of the mass flowmeter while it is in operation. This not only obviates the need for interrupting the measuring operation in order to define the characteristic values but it also makes these characteristic values available in "on-line" fashion, i.e. in real time, allowing them to be continuously factored into the determination of the mass flow.

In a preferred, enhanced version of this invention, the Coriolis conduit can be-excited in a third oscillation pattern which is independent of the first oscillation pattern and of the second oscillation pattern, and the response of the Coriolis conduit, captured by the detectors, to the excitation in the first oscillation pattern, to the excitation in the second oscillation pattern and to the excitation in the third excitation pattern permits the model-based determination of the characteristic values of the mass flowmeter. A further enhancement of the determination of the characteristic values is attainable with the mass flowmeter according to this invention by means of provisions whereby the Coriolis conduit is additionally excitable in a fourth oscillation pattern independent of the first oscillation pattern, the second oscillation pattern and the third oscillation pattern, and as a result of the response of the Coriolis conduit, captured by the detectors, to the excitation in the first oscillation pattern, the excitation in the second oscillation pattern, the excitation in the third oscillation pattern and the excitation in the fourth oscillation pattern, characteristic values of the mass flowmeter can be determined.

For obtaining mutually independent oscillation patterns, the particularly preferred approach according to the invention is to generate the first oscillation pattern and the third oscillation pattern within an identical mode except with mutually phase-shifted oscillations, with particular preference being given to a 90° phase shift between the first oscillation pattern and the third oscillation pattern. Correspondingly, according to the invention, it is equally desirable for the second oscillation pattern and the fourth oscillation pattern to be generated within the same mode with mutually phase-shifted oscillations, with this latter mode differing from that of the first and third oscillation patterns. According to the invention, particular preference is again given to a 90° phase shift between the second and the fourth oscillation pattern.

It is also particularly desirable for the first oscillation pattern to be constituted of an oscillation in the operating mode of the Coriolis conduit. In like fashion, the third oscillation pattern is constituted of an oscillation in the operating mode of the Coriolis conduit, except with a phase shift of preferably 90°. It is equally desirable for the second oscillation pattern to be constituted of a Coriolis-mode oscillation of the Coriolis conduit and, correspondingly, for the fourth oscillation pattern to be constituted of a Coriolis-mode oscillation of the Coriolis conduit, except again phase-shifted relative to the former by preferably 90°.

This is a particularly simple and elegant solution whereby a mass flowmeter of this type can be excited along four independent, mutually orthogonal oscillation patterns, where two of these oscillation patterns are constituted of two oscillations that are phase-shifted relative to each other by 90° and generated in the operating mode of the Coriolis conduit while two of the oscillation patterns are constituted of two oscillations that are phase-shifted relative to each other by 90° and generated in the Coriolis mode of the Coriolis conduit.

It is fundamentally possible to determine numerous parameters of the flowmeter according to this invention. Particularly advantageous, however, is the fact that the zero point and the sensitivity of the mass flowmeter are definable parameters. In the final analysis, it is these parameters that play a significant, decisive role in the accurate determination of the mass flow.

Within the bounds of practical design considerations, the two oscillators and the two detectors can be positioned in any desired location. According to the invention, however, particular preference is given to the positioning of each oscillator within the same axial region as a corresponding detector. In this context, it is especially desirable to place the pairs, each consisting of an oscillator and a detector, in a location that is axially equidistant from the center of the Coriolis conduit and preferably opposite each other.

In an alternative preferred design implementation of the mass flowmeter according to this invention the two detectors are each integrated in an oscillator. This adds the benefit of reducing the number of components needed for the mass flowmeter of this invention.

Another preferred enhancement of the mass flowmeter according to the invention incorporates a digital signal processor for signal processing, regulating and control purposes.

Finally, given the above-mentioned advantages offered by Coriolis-type mass flowmeters with only one straight Coriolis conduit, a particularly preferred implementation of this invention is based on a design that employs one single Coriolis conduit which is essentially straight.

Based on the above, the Coriolis-type mass flowmeter determines parameters which must be provided as supplementary information for improving the measuring accuracy, in on-line fashion. These online-defined parameters include structural information on the internal representation of the characteristic values zero-point and sensitivity, as well as on the known delimiting factors, meaning external parameters within which the measuring process takes place.

The method per this invention which serves to solve the problems mentioned further above is typified by the fact that characteristic values of the mass flowmeter are determined on the basis of a model.

The basic concept of the method of the invention thus provides the model for the oscillating fluid-conducting Coriolis conduit which is entirely defined by those parameters that can be determined by virtue of the response of the fluid-conducting Coriolis conduit to the excitation in the mutually independent oscillation patterns.

While this model-based determination of the characteristic values of the mass flowmeter can take place prior to its start-up or during operating stoppages, it is preferable according to the invention to determine these characteristic values of the mass flowmeter while it is in operation.

In a preferred, enhanced version of this invention, the Coriolis conduit is excited in a third oscillation pattern which is independent of the first oscillation pattern and of the second oscillation pattern, and the response of the Coriolis conduit, captured by the detectors, to the excitation in the first oscillation pattern, to the excitation in the second oscillation pattern and to the excitation in the third oscillation pattern permits the model-based determination of the characteristic values of the mass flowmeter.

Additional provisions may be made whereby the Coriolis conduit is excited in a fourth oscillation pattern independent of the first oscillation pattern, the second oscillation pattern and the third oscillation pattern and the response of the Coriolis conduit, captured by the detectors, to the excitation in the first oscillation pattern, the excitation in the second oscillation pattern, the excitation in the third oscillation pattern and the excitation in the fourth oscillation pattern permits the model-based determination of the characteristic values of the mass flowmeter.

As has been explained in detail further above in the description of the mass flowmeter according to this invention, a particularly preferred approach is to generate the first oscillation pattern and the third oscillation pattern within an identical mode except with their oscillations mutually phase-shifted preferably by 90°, and to generate the second oscillation pattern and the fourth oscillation pattern within the same mode except again with their oscillations phase-shifted by 90°, but with the latter mode differing from that of the first and third oscillation patterns. The first oscillation pattern is preferably constituted of an oscillation in the operating mode of the Coriolis conduit and/or the second oscillation pattern is constituted of an oscillation in the Coriolis mode of the Coriolis conduit. In like fashion, the third oscillation pattern as well is preferably constituted of an oscillation in the operating mode of the Coriolis conduit and the fourth oscillation pattern is preferably constituted of a Coriolis-mode oscillation of the Coriolis conduit.

The method of this invention is particularly suitable for mass flowmeters with one essentially straight Coriolis conduit but is not limited thereto.

BRIEF DESCRIPTION OF THE DRAWINGS

There are many different ways in which the mass flowmeter and the mass-flow measuring method according to this invention can be implemented and further enhanced. In this connection, reference is made to the dependent claims and to the following description of a preferred design implementation with reference to the attached drawing, in which:

DESCRIPTION OF THE PREFERED EMBODIMENTS

Figure 1:
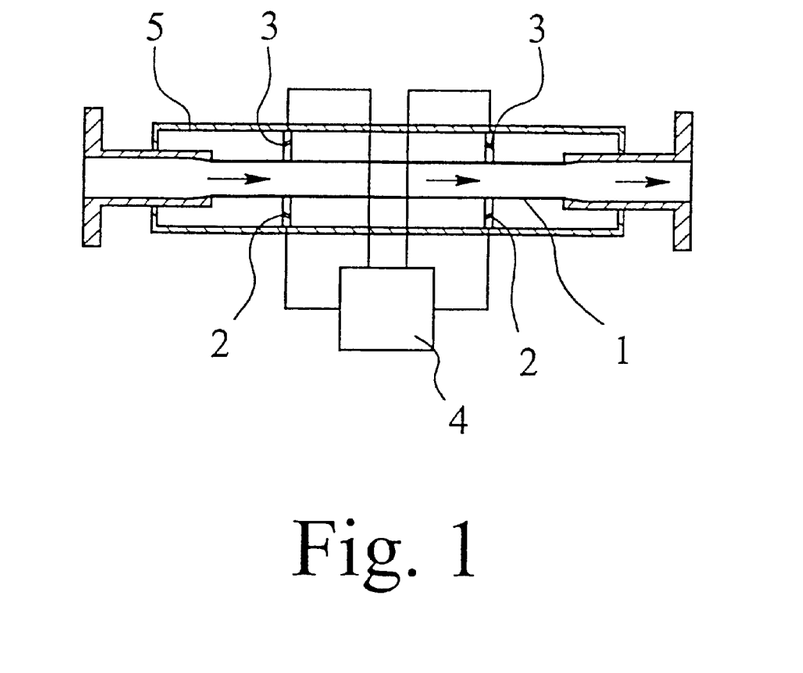
FIG. 1 is a schematic diagram of a mass flowmeter according to a preferred embodiment of this invention.

FIG. 1 is a simplified block diagram of the mass flowmeter according to the preferred embodiment of this invention. The mass flowmeter consists essentially of a Coriolis conduit 1, two oscillators 2 serving to excite the Coriolis conduit 1, two detectors 3, a digital signal processor 4 and a carrier tube 5. Each of the two oscillators 2 is located in the same axial region as one of the detectors 3 and is in each case positioned at the same distance from the center of the Coriolis conduit 1. A fluid whose mass flow rate is to be measured flows through the Coriolis conduit 1 in the direction of the arrow. As in the case of many conventional Coriolis mass flowmeters, the Coriolis conduit 1 is surrounded by a carrier tube 5 which is attached at both the input and the output ends of the Coriolis conduit 1. In the case of the mass flowmeter according to the preferred embodiment of this invention, all of the signal processing, regulating and control functions are fully digital and are handled by the digital signal processor 4. The signals emanating from the detectors 3 are subjected to single-stage wide-band amplification and then digitized. The control signals generated by the digital signal processor 4 for the oscillators 2 merely pass through a voltage-current converter, not illustrated.

Figure 2:
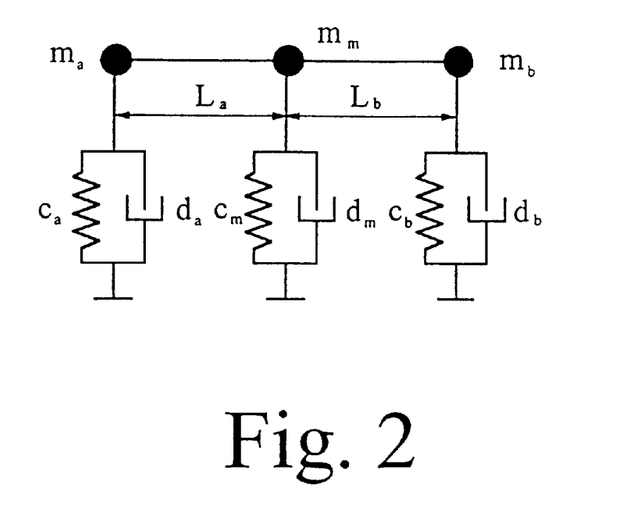
FIG. 2 shows the mechanical model of the mass flowmeter employed for the preferred embodiment of the method according to this invention.

The mass flowmeter model on which the method according to the preferred embodiment of this invention is based employs a Coriolis conduit 1 which is not rigidly clamped and which, ideally, is symmetric in terms of its dimensions and material properties. This makes it possible to mathematically illustrate the real-world variations of the characteristic values such as zero point and sensitivity, given that these variations are to be found in the inevitable asymmetries within the mass flowmeter. The causes of such asymmetries include for instance machining and assembly tolerances in production, especially as they relate to the Coriolis conduit 1, the oscillators 2, the detectors 3, the carrier tube 5 and the Coriolis-tube mount, but also density and viscosity fluctuations of the fluid passing through the Coriolis conduit 1, temperature gradients as well as pressure gradients along the Coriolis conduit 1, and deposits inside the Coriolis conduit 1.

A particularly practical and elegant form of a model that is especially well suited to the on-line determination of the characteristic values of the mass flowmeter is a mass flowmeter with discrete, concentrated elements. The corresponding mechanical model is schematically illustrated in FIG. 2. The effective oscillating mass of the left half of the Coriolis conduit 1 is assumed as the ideal substitute mass $m_a$ in the location of the left-hand detector 3 at $L_a$. Correspondingly, the mass $m_b$ of the right half of the Coriolis conduit 1 is assumed to be in the location of the right-hand detector 3 at $L_b$. A central substitute mass $m_m$ takes into account the masses which participate in the translatory movement only, not those in rotation. The masses $m_a$, $m_m$ and $m_b$ are connected with one another via a mass-less, radially rigid yet axially flexible, bar. Both internal and external forces impinge on these masses. The same is true for the substitute springs $c_a$, $c_m$ and $c_b$ as well as for the attenuators $d_a$, $d_m$ and $d_b$.

Figure 3:
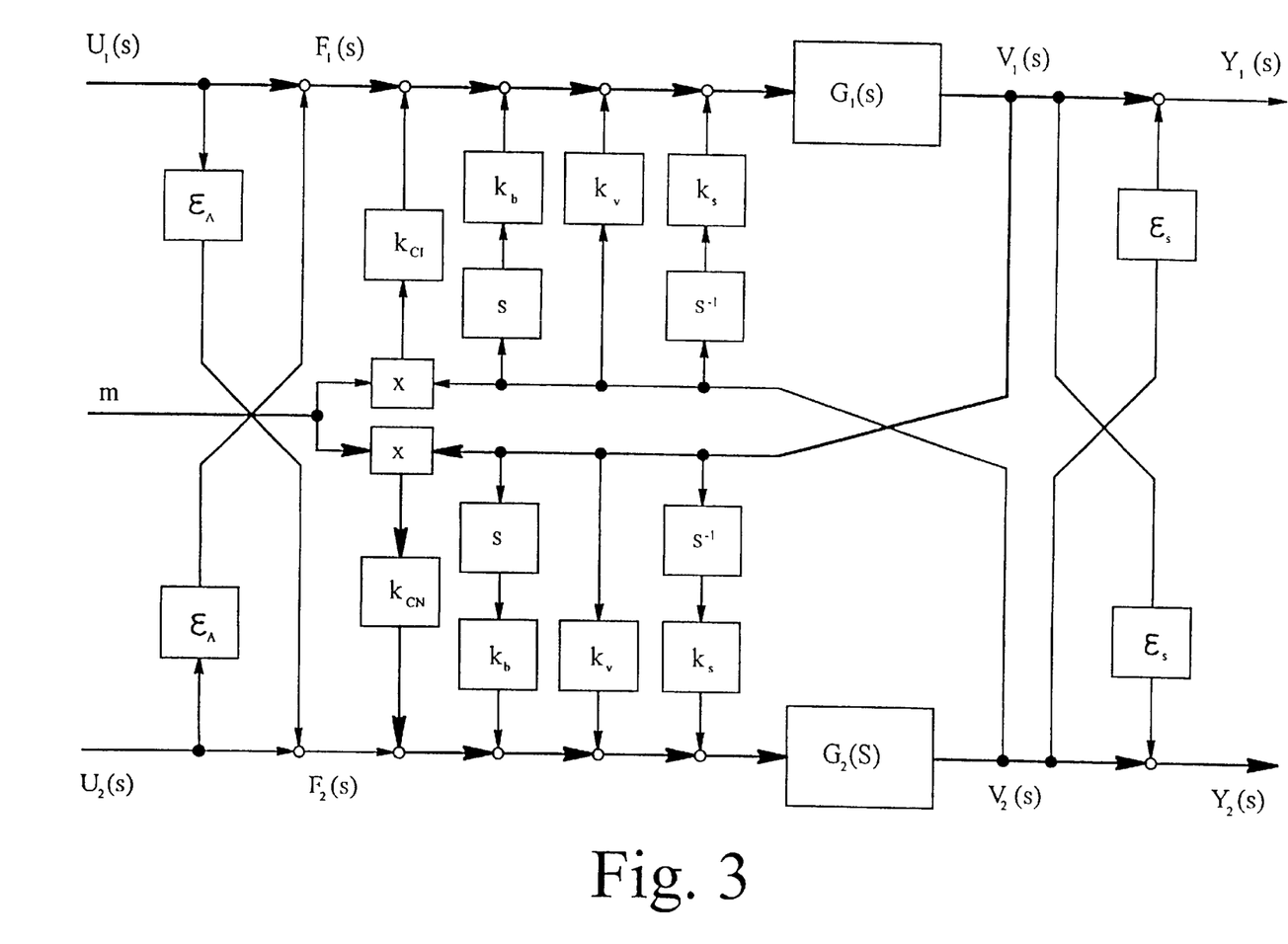
FIG. 3 is a functional diagram showing the essential functional structure of the mass flow-meter according to the preferred embodiment of the invention.

The basic functional structure of the model-derived mass flowmeter according to the preferred embodiment of this invention, with all its possible coupling points, is shown in FIG. 3. The bold function lines highlight the normal operating mode. The important components in this case are the two oscillators $G_1(s)$ and $G_2(s)$, $$G_1(s) = \frac{V_1(s)}{F_1(s)} = \frac{k_1 s}{s^2 + 2d_1\omega_{01}s + \omega_{01}^2} \quad (1)$$

$$G_2(s) = \frac{V_2(s)}{F_2(s)} = \frac{k_2 s}{s^2 + 2d_2\omega_{02}s + \omega_{02}^2} \quad (2)$$

which are mutually coupled in six different ways. These couplings describe the asymmetries in the mass flowmeter:

1. The acceleration-coupling $k_b$ comes about as a result of differences in the oscillating masses ($m_a \neq m_b$) of the two halves of the Coriolis conduit 1.

2. The displacement coupling $k_s$ is a result of uneven potential energy storage in the two halves of the Coriolis conduit 1 ($c_a \neq c_b$).
3. A speed coupling $k_v$ exists when the dissipated energies in the two halves of the Coriolis conduit 1 are of different magnitudes but move at the same speed ($d_a \neq d_b$)
4. The thrust coupling $\epsilon_A$ expresses the difference in the static properties of the oscillators 2.
5. The sensor coupling $\epsilon_S$ describes the different static properties of the detectors 3.
6. The mass flow-related couplings $k_{CN}$ and $k_{CI}$ are the only desirable couplings of the two oscillating systems. They permit the measurement of the mass flow.

Identifying the model parameters in the time domain is not possible due to the extremely weak attenuation of the two modes, given that, with PRBS excitation, the response signals display measurable spectral components only in a very narrow-banded region around their intrinsic frequencies. Identification in the frequency domain is therefore preferred.

The transfer functions between thrust in mode i={1,2} and measurement in mode j={1,2} are as follows:

$$G_{ij}(s) = \frac{Z_{ij}(s)}{N_{ij}(s)} = \frac{\sum_{l=0}^{m} b_{ijl} s^l}{\sum_{v=0}^{n} a_{ijv} s^v} \quad (3)$$

The nominator polynomes $N_{ij}(s)$ are identical for all four transfer functions $G_{ij}(s)$. The coefficients of the four transfer functions $\underline{\theta} = \{a_{ijv}, b_{ijl}\}$ are linked to the physical system parameters $\underline{\rho} = (\omega_{01k}, \omega_{02k}, d_{01k}, \ldots)$ via nonlinear relations.

$$\underline{\theta} = f(\underline{\rho}) \quad (4)$$

This function is rather complicated and its inverse function is generally undefinable. Moreover, in the case at hand, the number of unknown parameters is greater than the number of definitive equations. This is evidenced by multiple equifunctional paths in the functional structure of FIG. 3. It is for that reason that for the solution in this case a special approach has been taken.

First, the input and output couplings, i.e. the differences in the oscillators $\epsilon_A$ and in the detectors $\epsilon_S$, were experimentally determined and corrected. Next, the acceleration and speed couplings ($k_b$ and $k_s$) were combined at frequency $\omega_{01}$, and $k_{sb}$. In the case at hand, this is both possible and practical since only the difference between the two couplings becomes a factor. That was followed by a maximum-likelihood estimation of the remaining model coefficients in the frequency domain from which the unknown physical parameters were then calculated.

For determining the parameters it is necessary to obtain on-line data in addition to the a-priori information provided in the preceding sections. Such data can be obtained by means of additional sensors, or by a suitable supplementary excitation of the system and a model-assisted evaluation of the system responses. In the preferred design example of this invention as described here, additional excitation is selected.

The underlying idea is to simulate the Coriolis conduit 1 in defined fashion both in its first and in its second intrinsic pattern in order to draw information on the response of the mass flowmeter.

FIG. 3 provides a direct reading of the speed responses of the intrinsic patterns:

$$V_1(s) = G_1(s)\left[F_1(s) + V_2(s)\left(sk_b + k_{CI}\dot{m} + k_v + \frac{k_s}{s}\right)\right] \quad (5)$$

$$V_2(s) = G_2(s)\left[F_2(s) + V_1(s)\left(sk_b + k_{CN}\dot{m} + k_v + \frac{k_s}{s}\right)\right] \quad (6)$$

In the following description, these equations serve to define the appropriate modes of operation of the mass flowmeter and constitute the basis for the determination of the characteristic values zero-point and sensitivity.

In normal operation of the mass flowmeter, only the first intrinsic pattern is excited externally. This mode is characterized by:

$$F_{2N}(s)=0; \ \omega=\omega_{01}; \ F_{1N}=\text{const.}; \ L(F_{1N}V_{1N})=0; \ \omega_{02}>\omega_{01}$$

Given these specifications, we obtain the following relations for $V_{1N}$ and $V_{2N}$:

$$\text{Re}\{V_{1N}\} = \quad (7)$$
$$\text{Re}\{G_1\}\left[\text{Re}\{F_{1N}\} + \text{Re}\{V_{2N}\}(k_{CI}\dot{m} + k_v) + \text{Im}\{V_{2N}\}\left(\frac{k_s}{\omega_{01}} - \omega_{01}k_b\right)\right]$$

$$\text{Re}\{V_{2N}\} = \text{Im}\{G_2\}\text{Re}\{V_{1N}\}\left(\frac{k_s}{\omega_{01}} - \omega_{01}k_b\right) \quad (8)$$

$$\text{Im}\{V_{2N}\} = \text{Im}\{G_2\}\text{Re}\{V_{1N}\}(k_{CN}\dot{m} + k_v) \quad (9)$$

The time offset $\Delta t$ between the input and output signals $V_a$ and $V_b$ of the detectors 3 is determined by the following:

$$y_{MN} := \Delta t = \frac{1}{\omega_{01}} \cdot \Delta_\varphi \approx \frac{1}{\omega_{01}} \cdot \frac{\text{Im}\{V_{2N}\}}{\text{Re}\{V_{1N}\}} \quad (10)$$

When equation (9) is inserted in equation (10), the result will be the static characteristic of the mass flowmeter in normal operation:

$$y_{MN} = \underbrace{\frac{\frac{1}{\omega_{01}}\text{Im}\{G_2\}k_{CN}}{E_N = \text{Sensitivity}}}\dot{m} + \underbrace{\frac{\frac{1}{\omega_{01}}\text{Im}\{G_2\}k_v}{N_N = \text{Zero-point}}} \quad (11)$$

The sensitivity and zero-point parameters can be determined by calibrating the mass flowmeter. However, they are time-dependent since they reflect the environmental conditions as these change over time.

The displacement and acceleration couplings interfere in two ways. On the one hand they influence the operating frequency, thus affecting density measurements. On the other hand they obstruct the determination of the mass flow by way of equation (7). An elegant way out is the decoupling of the two intrinsic patterns in terms of deflection and acceleration. To that end it is necessary to compensate for the following coupling-related forces:

$$F_{1\text{Coupling}} = \text{Im}\{V_{2N}\}\left(\frac{k_s}{\omega_{01}} - \omega_{01}k_b\right) \quad (12)$$

$$F_{2\text{Coupling}} = \text{Re}\{V_{1N}\}\left(\frac{k_s}{\omega_{01}} - \omega_{01}k_b\right) \quad (13)$$

Inserting the equation (8) in the equations (12) and (13) will reveal the coupling forces and thus the compensating forces needed:

$$F_{1Coupling} = \frac{\text{Im}\{V_{2N}\}}{\text{Im}\{G_2\}} \cdot \frac{\text{Re}\{V_{2N}\}}{\text{Re}\{V_{1N}\}} \qquad (14)$$

$$F_{2Coupling} = \frac{\text{Re}\{V_{2N}\}}{\text{Im}\{G_2\}} \qquad (15)$$

$F_{2coupling}$ can even be determined by a compensating method independent of any possible change of Im ($G_2$). This is accomplished by zeroing the measured quantity Re $\{V_{2N}\}$ in a control loop by way of the excitation of the second intrinsic pattern $F_{2compensation}$. The forced result of the zeroing will thus be:

$$F_{2\,Coupling} = -F_{2\,Compensation} \qquad (16)$$

The equations (14), (15) and (16) also permit the determination of $F_{1coupling}$ independent of Im $\{G_2\}$. It is then compensated for by way of an additional excitation of the first intrinsic pattern by:

$$F_{1Compensation} = -F_{1Coupling} = F_{2Compensation} \cdot \frac{\text{Im}\{V_{2N}\}}{\text{Re}\{V_{1N}\}} \qquad (17)$$

After the two intrinsic patterns have been decouples in terms of deflection and acceleration, the following relations will be obtained for $V_{1NK}$ and $V_{2NK}$:

$$Re\{V_{1NK}\} = Re\{G_1\}Re\{F_{1N}\} \qquad (18)$$

$$Re\{V_{2NK}\} = 0 \qquad (19)$$

$$Im\{V_{2NK}\} = Im\{G_2\}Re\{V_{1NK}\}(k_{CN}\dot{m} + k_v) \qquad (20)$$

The static characteristic of the mass flowmeter in this operating mode, in which the displacement coupling and the acceleration coupling have been compensated, will be obtained via equation (20):

$$y_{MNK} := \frac{1}{\omega_{01}} \cdot \frac{\text{Im}\{V_{2NK}\}}{\text{Re}\{V_{1NK}\}} = \frac{1}{\omega_{01}}\text{Im}\{G_2\}k_{CN}\dot{m} + \frac{1}{\omega_{01}}\text{Im}\{G_2\}k_v. \qquad (21)$$

This characteristic is identical to that of the mass flowmeter in normal operation according to equation (11).

In the inverse operation of the mass flowmeter only the second intrinsic pattern is excited externally. This operating mode is characterized by:

$$Fi_f(s) = 0; \ \omega = \omega_{01}; \ F_{2I} = \text{const.}; \ \omega_{02} => \omega_{01}$$

Under these operating conditions, plus the compensation of the displacement and acceleration couplings, the result for $V_{1I}$ and $V_{2I}$ will be:

$$Re\{V_{1I}\} = Re\{G_1(j\omega_{01})\}Re\{V_{2I}\}(k_{CI}\dot{m} + k_v) \qquad (22)$$

$$Re\{V_{2I}\} = Im\{G_2\}Im\{F_{2I}\} \qquad (23)$$

$$Im\{V_{2I}\} = Im\{G_2\}[Re\{F_{2I}\} + Re\{V_{1I}\}(k_{CN}\dot{m} + k_v)] \qquad (24)$$

For the static characteristic of the mass flowmeter in inverse operation, equation (22) results in the following:

$$y_{MI} := \frac{\text{Re}\{V_{1I}\}}{\text{Re}\{V_{2I}\}} = \underbrace{\text{Re}\{G_I\}k_{CI}}_{E_I}\dot{m} + \underbrace{\text{Re}\{G_I\}k_v}_{N_I} \qquad (25)$$

where $E_I$ and $N_I$ designate the sensitivity and zero-point parameters in inverse operation.

With the exception of the term Re $\{F_{2I}\}$, the equation (24) corresponds to the static characteristic of the mass flowmeter in normal operation (ref. equation (9)). If $F_{2I}$ is selected to be orthogonal relative to $V_I$, normal and inverse operation will have next to no effect on each other. This is critically important since in pure inverse operation, the observability of the operating frequency $\omega_{01}$ is not always assured, requiring both intrinsic patterns to be excited simultaneously (mixed operation).

The following applies to mixed operation:

$$\omega = \omega_{01}; \ F_{1M} = F_{1N} = \text{const.}; \ L\{F_{1M}V_{1M}\} = 0;$$

$$F_{2M} = \text{const.}; \ L\{F_{1M}F_{2M}\} = 90°; \ \omega_{02} > \omega_{01}$$

From this, $V_{1M}$ and $V_{2M}$ can be calculated following the equations (5) and (6), with the displacement and acceleration compensation factored in:

$$Re\{V_{1M}\} = Re\{G_1\}[Re\{F_{1M}\} + Re\{V_{2M}\}(k_{CI}\dot{m}k_v)] \qquad (26)$$

$$Re\{V_{2M}\} = Im\{G_2\}Im\{F_{2M}\}Im\{F_{2M}\} \qquad (27)$$

$$Im\{V_{2M}\} = Im\{G_2\}Re\{V_{1M}\}(k_{CN}\dot{m} + k_v) \qquad (28)$$

Inserting the equation (18) in equation (26) will produce the characteristic of the mass flowmeter in inverse operation:

$$y_{MMI} := \frac{\text{Re}\{V_{1M}\} - \text{Re}\{V_{1NK}\}}{\text{Re}\{V_{2M}\}} = \text{Re}\{G_1\}k_{CI}\dot{m} + \text{Re}\{G_1\}k_v \qquad (29)$$

The equation (28) will lead to the normal-operation characteristic for:

$$y_{MMN} := \frac{1}{\omega_{01}} \cdot \frac{\text{Im}\{V_{2M}\}}{\text{Re}\{V_{1M}\}} = \frac{1}{\omega_{01}}\text{Im}\{G_2\}k_{CN}\dot{m} + \frac{1}{\omega_{01}}\text{Im}\{G_2\}k_v \qquad (30)$$

According to equation (11), sensitivity determinations during operation require three parameters. The first parameter $k_{CN}$ describes the conversion of the distributed Coriolis forces along the Coriolis conduit into localized forces within the model. It is therefore viewed as an invariable constant. The second parameter $\omega_{01}$ is the regulated variable for $L\{F_1, V_1\} = 0$ and is therefore known. The third parameter $\text{Im}\{G_1\}$ is determined during operation using equation (27). Hence, the defining equation for the sensitivity will be:

$$E_N = k_{CN} \cdot \frac{1}{\omega_{01}} \cdot \frac{\text{Re}\{V_{2M}\}}{\text{Im}\{F_{2M}\}} \qquad (31)$$

For determining the zero point, following equation (11), all that remains to be defined in addition to the already known parameter Im ($G_2$) (equation (27)) is $k_v$. To that end, $\dot{m}$ in the two characteristics for normal and inverse operation (equations (29) and (30)) is eliminated and resolved into $k_v$. After $k_v$ has been inserted in equation (11) and equations (18) and (27) have been taken into account, the zero point is obtained for the defining equation:

$$N_N = \frac{k_{CN}\text{Re}\{F_{1N}\}\text{Re}\{V_{1M}\}(\text{Re}\{V_{1M}\} - \text{Re}\{V_{1NK}\})}{(k_{CN} - k_{CI})\text{Re}\{V_{1M}\}\text{Re}\{V_{3M}\}\text{Re}\{V_{1NK}\}} - \frac{k_{CI}\text{Im}\{F_{2M}\}\text{Re}\{V_{1NK}\}\text{Im}\{V_{2M}\}}{(k_{CN} - k_{CI})\text{Re}\{V_{1M}\}\text{Re}\{V_{2M}\}\text{Re}\{V_{1NK}\}} \qquad (32)$$

The equations (31) and (32) thus permit the determination of the characteristic values zero-point and sensitivity parameters during operation.

Correspondingly, according to the preferred embodiment of the invention illustrated, the essential data for the Coriolis mass flowmeter are stored in a fourth-order physiomathematical model. To that end, on the basis of a continuous-model approach for the interaction between the flowing fluid and the oscillating Coriolis measuring tube, a discrete model with concentrated parameters has been generated that describes the two most important oscillation modes of the Coriolis conduit and their mutual couplings. These couplings come about both by the mass flow to be measured as it travels through the Coriolis conduit and by the structural asymmetries. For the determination of the zero-point and sensitivity parameters, the two intrinsic patterns of the Coriolis conduit in normal operation are decoupled in terms of deflection and acceleration, which forces a symmetrization of the movement of the Coriolis conduit. An analysis of the intrinsic patterns excited by orthogonal forces, employing the mathematical-physical model created along the preferred design example of the invention, permits the description and determination of the characteristic values zero-point and sensitivity parameters of the Coriolis mass flowmeter.

As pointed out further above, the method according to this invention allows for a correction of the density measurements. The following will restate in detail the possibilities offered by the invention for correcting density measurements, as contrasted to prior art.

The density of the moving fluid can be determined in a Coriolis mass flowmeter equipped with a single straight measuring tube by means of the resonant frequency of the first mode:

$$\omega_{01} = \sqrt{\frac{c_a + c_m + c_b}{m_a + m_m + m_b}} = \sqrt{\frac{c_1}{m_R + V\rho}} \Rightarrow \rho = \frac{c_1}{V} \cdot \frac{1}{\omega_{01}^2} - \frac{m_R}{V} \quad (33)$$

where $\omega_{01}$=resonant frequency (operating frequency)
$\rho$=density of the fluid
$V$=volume of the measuring tube
$m_R$=mass of the measuring tube
$c_1$=rigidity constant of the measuring tube (affecting mode 1)

The overall rigidity constant of the Coriolis conduit relative to the first mode $c_1$ is composed of the rigidity constants of the alternative mechanical model $c_a$, $c_m$ and $c_b$. These rigidity constants are a function of the modulus of elasticity of the Coriolis conduit and are thus temperature-dependent. They also change dual to axial stress. Hence, the dependence of the rigidity constant on temperature and axial stress is expressed by this relation:

$$c_1 = c_a + c_m + c_b = f(T, \sigma_c) \quad (34)$$

where T is the temperature and $\sigma_c$ represents the axial stress.

Calculating the fluid density by the above equation requires compensation for both the temperature and the effect of axial stress. The correction factors are determined in conventional fashion by means of additional measurements, for instance one of the temperature and one of the expansion coefficient, or two temperature measurements, i.e. one on the Coriolis conduit, the other at the clamping point.

In the case of the Coriolis mass flowmeter according to the invention and of the model-based method per the invention, the density measurement can also be corrected by employing the measured rigidity constant $c_2$ of the second mode. This rigidity constant changes both with the temperature and with the axial stress and may be used for determining one of the two values and thus for correcting at least one of the two effects. Given $$G_2(j\omega_{01}) = \frac{j\omega_{01}}{c_a + c_b} = \frac{j\omega_{01}}{c_2} \quad (35)$$

it is established during continuous operation by way of the equation $$c_2 = c_a + c_b = f(T, \sigma_a) \quad (36)$$
$$= \frac{j\omega_{01}}{G_2(j\omega_{01})}.$$

Figure 4A:
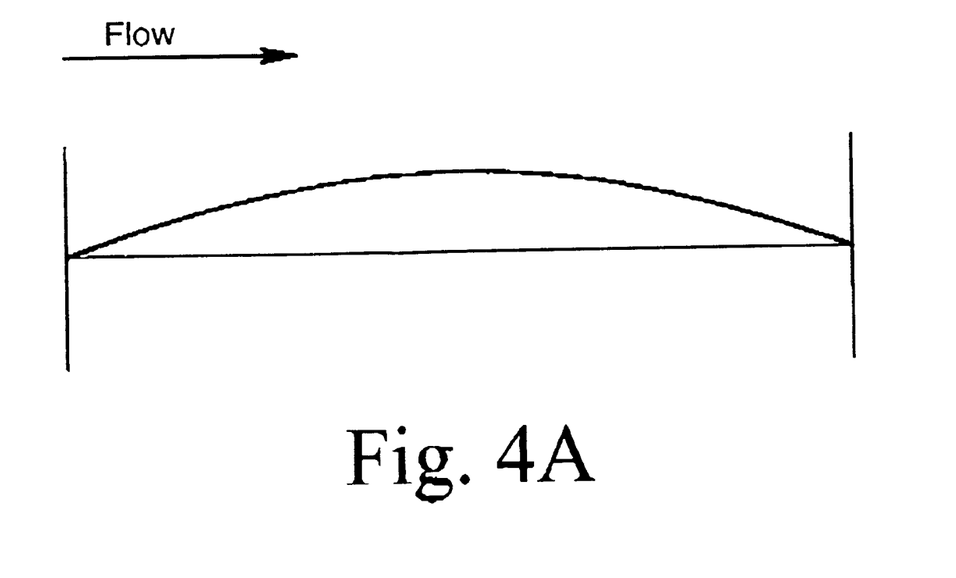
FIGS. 4A and 4B show the forms of the oscillation patterns according to the invention.
Figure 4B:
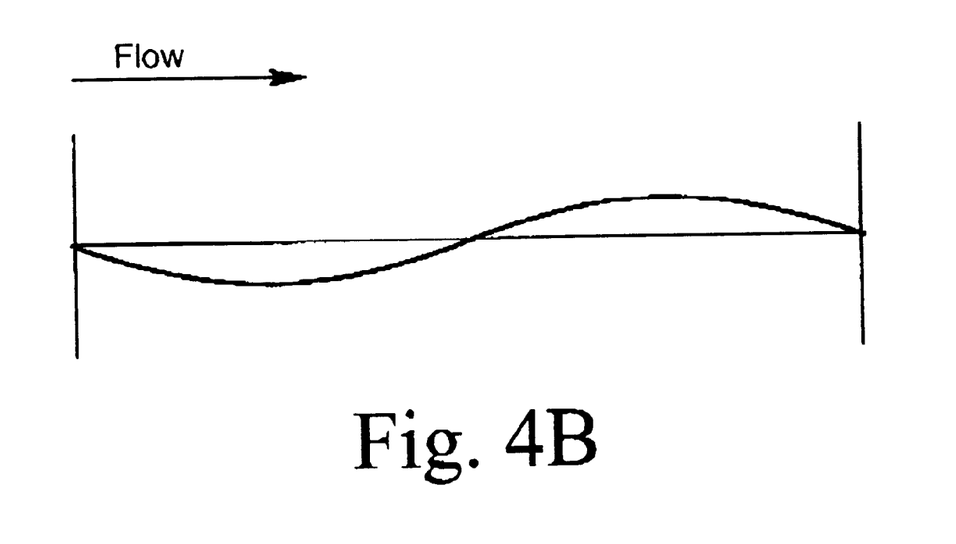

FIGS. 4A and 4B illustrate the forms or patterns of the oscillations of conduit 1 in the operating mode and Coriolis mode, respectively. The first and third oscillation patterns have the form shown in FIG. 4A, the first oscillation pattern being phase shifted by 90° with respect to the third pattern. FIG. 4B shows the form of the second and fourth oscillation patterns, the second oscillation pattern being phase shifted by 90° from the fourth oscillation pattern.

Copies of the above paragraphs showing the changes from the previous versions are also enclosed.

What is claimed is:

1. A method for online-determination of at least one characteristic value of a mass flowmeter operating by the Coriolis principal and incorporating a fluid-conducting Coriolis conduit, said method comprising the steps of:

exciting the Coriolis conduit in a first oscillation pattern;

exciting the Coriolis conduit in a second oscillation pattern, the second oscillation pattern being different from the first oscillation pattern;

capturing the response of the Coriolis conduit to the excitation in the first oscillation pattern and in the second oscillation pattern, and determining at least one characteristic value of the mass flowmeter by evaluating the response of the Coriolis conduit with the aid of a model in real time during operation of the mass flowmeter.

2. The method according to claim 1, including the additional step of:

determining as the at least one characteristic value the zero point and/or the sensitivity of the mass flowmeter.

3. The method according to claim 1, or 2, including the additional step of:

exciting the Coriolis conduit in a third oscillation pattern, the third oscillation pattern being different from the first oscillation pattern and from the second oscillation pattern.

4. The method according to claim 3, including the additional step of:

exciting the Coriolis conduit in a fourth oscillation pattern, the fourth oscillation pattern being different from the first oscillation pattern, from the second oscillation pattern and from the third oscillation pattern.

5. The method according to claim 4, including the additional step of:

generating the first oscillation pattern and the third oscillation pattern in the same mode of the Coriolis conduit by oscillations which are mutually phase-shifted by 90°.

6. The method according to claim 5, comprising the additional step of:

generating the second oscillation pattern and the fourth oscillation pattern in the same mode of the Coriolis conduit by oscillations which are mutually phase-shifted by 90°.

7. The method according to claim 1, or 2, including the additional step of:

generating the first oscillation pattern by an oscillation in the operating mode of the Coriolis conduit.

8. The method according to claim 1, or 2, including the additional step of:

generating the second oscillation pattern by an oscillation in the Coriolis mode of the Coriolis conduit.

* * * * *